United States Patent
Lawlor et al.

(10) Patent No.: US 10,984,552 B2
(45) Date of Patent: Apr. 20, 2021

(54) METHOD, APPARATUS, AND SYSTEM FOR RECOMMENDING GROUND CONTROL POINTS FOR IMAGE CORRECTION

(71) Applicant: HERE GLOBAL B.V., Eindhoven (NL)

(72) Inventors: David Johnston Lawlor, Chicago, IL (US); Anish Mittal, San Francisco, CA (US); Zhanwei Chen, Richmond, CA (US)

(73) Assignee: HERE Global B.V., Eindhoven (NL)

( * ) Notice: Subject to any disclaimer, the term of this patent is extended or adjusted under 35 U.S.C. 154(b) by 71 days.

(21) Appl. No.: 16/523,651

(22) Filed: Jul. 26, 2019

(65) Prior Publication Data

US 2021/0027487 A1 Jan. 28, 2021

(51) Int. Cl.
| | | |
|---|---|---|
| *G06T 7/00* | (2017.01) | |
| *G06T 7/73* | (2017.01) | |
| *G01C 11/34* | (2006.01) | |
| *G06T 7/80* | (2017.01) | |

(52) U.S. Cl.
CPC ............... *G06T 7/74* (2017.01); *G01C 11/34* (2013.01); *G06T 7/80* (2017.01); *G06T 7/97* (2017.01); *G06T 2207/10032* (2013.01)

(58) Field of Classification Search
CPC .... G06T 7/74; G06T 7/97; G06T 7/80; G06T 2207/10032; G01C 11/34
See application file for complete search history.

(56) References Cited

U.S. PATENT DOCUMENTS

| | | |
|---|---|---|
| 6,735,348 B2 | 5/2004 | Dial, Jr. et al. |
| 9,251,419 B2 | 2/2016 | Johnston et al. |
| 9,454,796 B2 * | 9/2016 | Seitz .................. G06T 7/33 |

(Continued)

OTHER PUBLICATIONS

Nguyen, "Optimal Ground Control Points for Geometric Correction Using Genetic Algorithm with Global Accuracy", European Journal of Remote Sensing, (2015) 48:1; published online Feb. 17, 2017, pp. 101-120.

(Continued)

*Primary Examiner* — Ping Y Hsieh
(74) *Attorney, Agent, or Firm* — Ditthavong, Steiner & Mlotkowski

(57) ABSTRACT

An approach is provided for automatically recommending ground control points or any other feature points for image correction (e.g., satellite image correction). The approach, for example, involves collecting a plurality of images depicting a geographic area of interest. The approach also involves processing the plurality of images to detect one or more candidate feature points (e.g., ground control points or other features detectable in the images). The approach further involves performing a feature correspondence of the one or more candidate feature points across the plurality of images. The approach also involves triangulating respective locations of the one or more candidate feature points based on the feature correspondence. The approach further involves filtering the one or more candidate feature points based on the respective locations. The approach further involves providing the filtered one or more candidate feature points as an output comprising one or more recommended feature points.

20 Claims, 14 Drawing Sheets

(56) References Cited

U.S. PATENT DOCUMENTS

| | | | | |
|---|---|---|---|---|
| 2009/0154793 A1* | 6/2009 | Shin | ................... | G06K 9/3216 |
| | | | | 382/154 |
| 2014/0314307 A1* | 10/2014 | Bejeryd | ................. | G06T 7/593 |
| | | | | 382/154 |
| 2018/0188046 A1* | 7/2018 | Akiva | ............... | G06K 9/00201 |
| 2019/0244391 A1* | 8/2019 | Cope | ....................... | G06T 7/80 |
| 2020/0105009 A1* | 4/2020 | Eno | .......................... | G06T 7/74 |

OTHER PUBLICATIONS

Nitti et al., "Automatic Identification of Ground Control Points in Synthetic Aperture Radar Images Link", Mar. 10, 2017, retrieved from http://spie.org/news/6714-automatic-identification-of-ground-control-points-in-synthetic-aperture-radar-images?SSO=1, pp. 1-3.

ArcGIS Pro, "Adjustment Options for Ortho Mapping Satellite and Aerial Imagery", retrieved on Jul. 26, 2018 from https://pro.arcgis.com/en/pro-app/help/data/imagery/adjustment-options-for-ortho-mapping-satellite-and-aerial-imagery.htm, pp. 1-4.

* cited by examiner

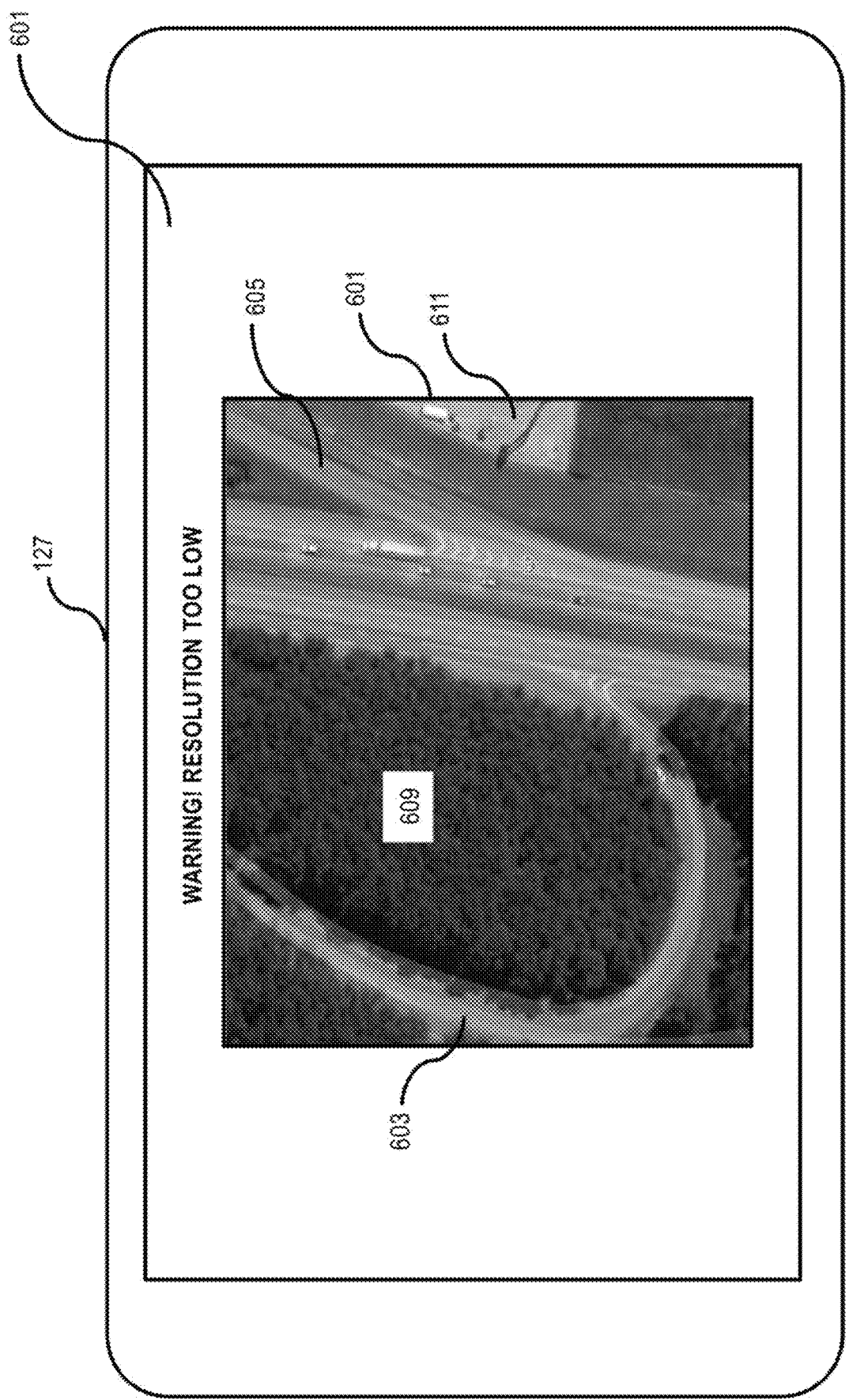

METHOD, APPARATUS, AND SYSTEM FOR RECOMMENDING GROUND CONTROL POINTS FOR IMAGE CORRECTION

BACKGROUND

Automated driving has quickly become an area of interest for vehicle manufacturers and navigation/mapping service providers following advances in machine learning, computer vision, and compute power. Digital maps in the form of models of the environment, for instance, are needed for a wide range of automated applications including driving, transportation, guidance, and search and rescue. The significant increase in the availability of high-quality satellite imagery is enabling scalable ways to create high definition digital maps from remote sensing data. However, the camera models supplied by the satellite image vendors are not accurate enough because of various errors in the satellite ephemeris and instrument calibration, there is still a need to correct the systematic biases in the camera models. To correct these errors, map service providers can use ground control points or any other detectable feature points to precisely align and/or to correct digital map data from different sources. Ground control points, for instance, are identifiable points on the Earth's surface that have a precise three-dimensional location (e.g., latitude, longitude, and elevation). However, the current options for generating ground control points are time and money intensive. Accordingly, map service providers face significant technical challenges to automatically select which points need to be collected or marked to meet the accuracy requirements of high precision map making.

SOME EXAMPLE EMBODIMENTS

Therefore, there is a need for an approach for automatically identifying areas/feature points that are visible from high-fidelity sources and are geographically distributed in a way that delivers maximum value to parameter adjustment/camera refinement.

According to one embodiment, a method comprises collecting a plurality of images depicting a geographic area of interest. The method also comprises processing the plurality of images to detect one or more candidate feature points (e.g., ground control points or any other feature or object detectable in the images). The method further comprises performing a feature correspondence of the one or more candidate feature points across the plurality of images. The method also comprises triangulating respective locations of the one or more candidate feature points based on the feature correspondence. The method further comprises filtering the one or more candidate feature points based on the respective locations. The method further comprises providing the filtered one or more candidate feature points as an output comprising one or more recommended feature points.

According to another embodiment, an apparatus comprises at least one processor, and at least one memory including computer program code for one or more computer programs, the at least one memory and the computer program code configured to, with the at least one processor, cause, at least in part, the apparatus to collect a plurality of images depicting a geographic area of interest. The apparatus is also caused to process the plurality of images to detect one or more candidate feature points (e.g., ground control points or any other feature or object detectable in the images). The apparatus is further caused to perform a feature correspondence of the one or more candidate feature points across the plurality of images. The apparatus is also caused to triangulate respective locations of the one or more candidate feature points based on the feature correspondence. The apparatus is further caused to filter the one or more candidate feature points based on the respective locations. The apparatus is further caused to provide the filtered one or more candidate feature points as an output comprising one or more recommended feature points.

According to another embodiment, a non-transitory computer-readable storage medium carrying one or more sequences of one or more instructions which, when executed by one or more processors, cause, at least in part, an apparatus to perform collecting a plurality of top-down images depicting a geographic area of interest. The apparatus is also caused to process the plurality of top-down images to detect one or more candidate feature points (e.g., ground control points or any other feature or object detectable in the images). The apparatus is further caused to perform a feature correspondence of the one or more candidate feature points across the plurality of top-down images. The apparatus is also caused to triangulate respective locations of the one or more candidate feature points based on the feature correspondence. The apparatus is further caused to filter the one or more candidate feature points based on the respective locations. The apparatus is further caused to provide the filtered one or more candidate feature points as an output comprising one or more recommended feature points.

According to another embodiment, an apparatus comprises means for collecting a plurality of images depicting a geographic area of interest. The apparatus also comprises means for processing the plurality of images to detect one or more candidate feature points (e.g., ground control points or any other feature or object detectable in the images). The apparatus further comprises means for performing a feature correspondence of the one or more candidate feature points across the plurality of images. The apparatus also comprises means for triangulating respective locations of the one or more candidate feature points based on the feature correspondence. The apparatus further comprises means for filtering the one or more candidate feature points based on the respective locations. The apparatus further comprises means for providing the filtered one or more candidate feature points as an output comprising one or more recommended feature points.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of example user interfaces for automatically recommending ground control areas/features for satellite image correction;

DESCRIPTION OF SOME EMBODIMENTS

Examples of a method, apparatus, and computer program for automatically recommending ground control areas/features for image correction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
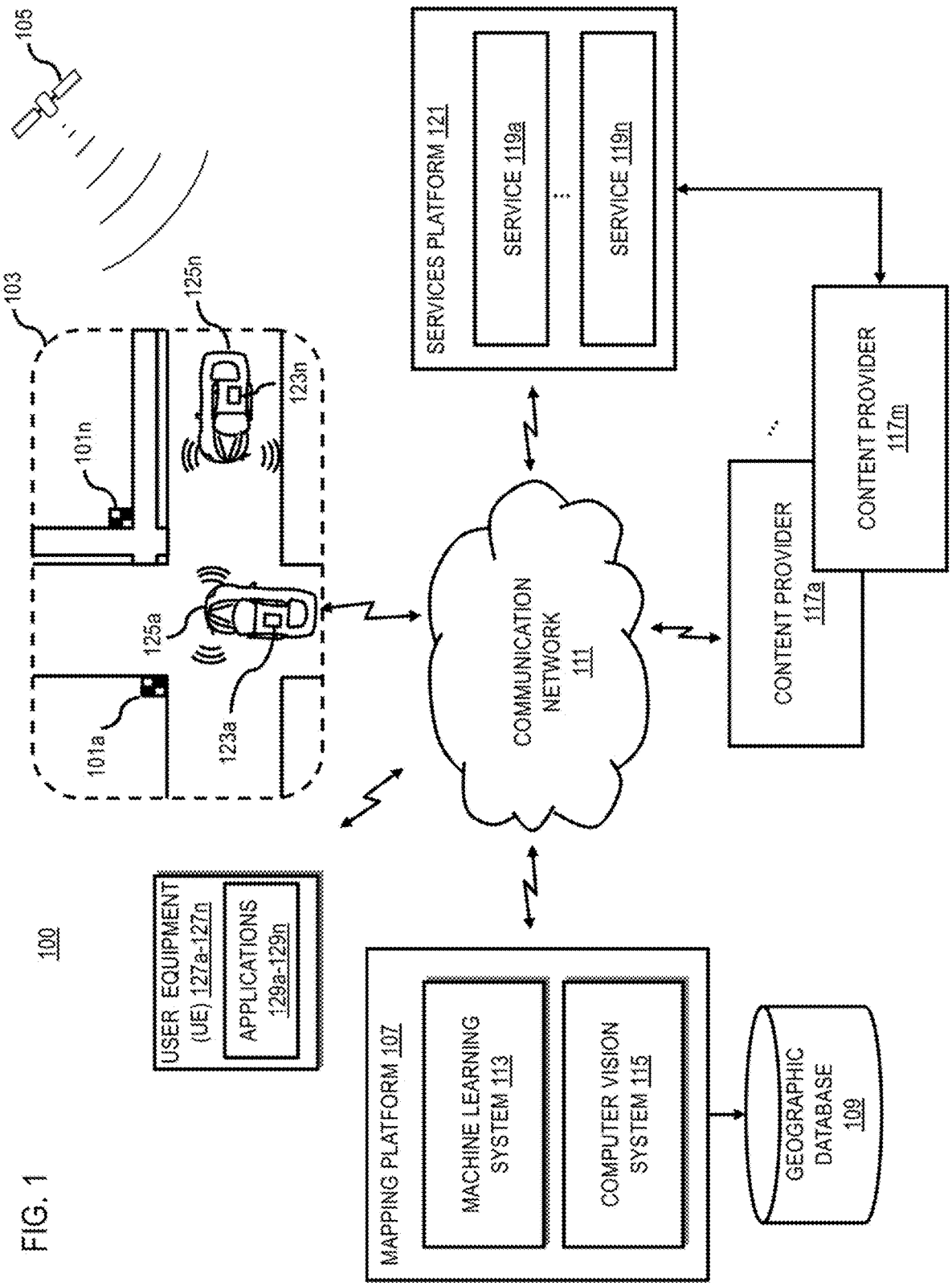
FIG. 1 is a diagram of a system capable of automatically recommending ground control areas/features for image correction, according to one embodiment.

FIG. 1 is a diagram of a system capable of automatically recommending ground control areas/features (e.g., ground control points) for image correction (e.g., satellite image correction), according to one embodiment. As indicated above, automated driving has quickly become an area of interest for vehicle manufactures and navigation/mapping service providers following advances in machine learning, computer vision, and compute power. The ability to perceive the world with an accurate semantic understanding enables vehicles (e.g., autonomous vehicles) to obey driving rules and avoid collisions. As these perceptual abilities have improved, so too has the need for highly accurate and up-to-date maps. Path planning, for instance, requires knowledge of what to expect beyond a vehicle's perceptual horizon, and driving in complicated urban environments with many occluding objects requires a knowledge of what cannot be seen.

Digital maps in the form of models of the environment, for instance, are needed for a wide range of automated applications including transportation, guidance, and search and rescue. Learning and automating the map creation and update process has therefore been a major research focus in the robotics and artificial intelligence (AI) community in the last decades. In addition, the significant increase in availability of high-quality satellite imagery is enabling scalable ways to create high-definition digital maps from remote sensing data. The satellite imagery provides a complimentary approach to deploying a large fleet of terrestrial vehicles fitted with expensive sensor systems (e.g., Light Detection and Ranging (LiDAR) or equivalent technology) to map the road network. Another advantage of the satellite data is that all the extracted features are relatively accurate since the same satellite image can cover hundreds of square kilometers. As a result, no relative alignment of the extracted features with respect to each other is needed, which minimizes costs since feature alignment is one of the costliest operations for terrestrial data. However, the camera models supplied by the satellite image vendors are not accurate enough because of various errors in the satellite ephemeris and instrument calibration, there is still a need to correct the systematic biases in the camera models so as to meet the accuracy requirements of high precision map making.

One way to achieve the absolute accuracy of extracted features, for example, is to bundle adjust the associated camera models using feature points which are geographic locations corresponding to features or objects that are detectable from an image. Examples of feature points include but are not limited to ground control points, geographic features, physical objects, and/or the like. In one embodiment, ground control points are defined as identifiable points on the Earth's surface that have a precise location (e.g., in the form of <Latitude, Longitude, Elevation>) that can be used for geo-referencing remote sensing data (e.g., aerial/satellite imagery). One option to collect ground control points is to send surveyors out in the field with instruments like theodolite, measuring tape, three-dimensional (3D) scanners, satellite-based location sensors (e.g., GPS/GNSS), level and rod, etc. to measure the location of the distinguishable landmarks on the earth (e.g., parts of signs, barriers, road paint). However, collecting each ground control point using such means requires a substantial amount of infrastructure and the problem becomes even more pronounced if the points need to be measured on the road (e.g., for map making use cases) since special access permissions may need to be obtained from a government or other responsible authorities. In addition, the collection may be performed without understanding which regions and feature points would be visible from satellite images collected in the area that needs to be mapped.

Alternatively, these feature points (e.g., ground control points) can be obtained from another high-fidelity source that observes them (e.g., a vehicle having one or more camera and/or LIDAR sensors). For instance, these feature points can be marked by human labelers in multiple terrestrial images that are found to be of high image quality and triangulated from there. However, both processes are time and money intensive. Accordingly, map service providers face significant technical challenges to quickly and cost effectively select which points need to be collected or marked to meet the accuracy requirements of high precision map making.

To address these problems, the system 100 of FIG. 1 introduces a capability for automatically recommending ground control areas/features (e.g., ground control points) for image correction (e.g., satellite image correction), according to one embodiment. In one embodiment, the system 100 automatically identifies ground control points 101a-101n (also collectively referred to herein as ground control points 101) such that the ground control points 101 are visible from satellite images relative to the area of interest and their geographic distribution delivers maximum value to the camera model adjustment in consideration. Although the various embodiments are described with respect to ground control points, it is contemplated that the embodiments are applicable to any type of feature point corresponding to the geographic locations of any feature or object that are detectable (e.g., via machine-based object recognition) in image data. Accordingly, ground control points are provided as example of feature points, and it is contemplated that descriptions referring to either feature point or ground control point alone is also applicable to the other.

In one embodiment, the system 100 identifies an area of interest 103 (e.g., a complicated urban environment) and then collects all available satellite images of the area (e.g., taken by one or more satellites 105). In one instance, the mapping platform 107 of the system 100 collects the satellite images from one or more vendor archives (e.g., a geographic database 109) via the communication network 111.

In one embodiment, the system 100 automatically detects the ground control points 101 in the satellite images using deep networks or other machine learning approaches (e.g., using the machine learning system 113 of the mapping platform 107 in combination with the computer vision system 115). In one instance, the system 100 can mark or label the ground control points 101 (e.g., an intersection of ground paint lines) that are visible from the satellite images in a large set of training images to train the machine learning system 113. In one embodiment, the training machine learning system 113 can then be used to automatically detect the locations of all such ground control points 101 in subsequently collected satellite images.

By way of example, curvilinear geometry intersections such as gore points, crosswalk corners, and boundaries of limit lines and lane boundaries are great candidates for ground control points. In one embodiment, the system 100 could also use other features or feature points as ground control points if they can be automatically detected. In one embodiment, the system 100 can automatically detect a feature based on any combination of designated properties such as but not limited to:

The ground control point/map feature should have a consistent definition so that the machine learning system 113 (e.g., machine learning models) can learn it;

The ground control point/map feature should be uniquely identifiable;

The ground control point/map feature should be spatially sparse so the correspondence task can be simplified; and The definition of the ground control point/map feature should be generalizable enough be applicable in different parts or regions of the world.

In one embodiment, the system 100 corresponds the feature points (e.g., one or more ground control points, one or more corresponding pixels, or a combination thereof) across the satellite images using one or more automatic feature correspondence techniques and then triangulates their locations. In one instance, the system 100 can determine pixel correspondences between the ground control points 101 labeled in each of the satellite images. The 3D position of the ground control points 101 can then be determined via a triangulation process from the pixel correspondences of each ground control point 101 in combination with a camera model or camera pose (e.g., camera position, pointing direction, etc.) of the camera system used to capture the image (e.g., a satellite 105).

In one instance, the system 100 filters out the feature points (e.g., ground control points) that are (1) found in areas that are outside of a collectible range if they need to be collected by ground surveyors; or (2) if the ground control on them is done using another high-fidelity source (e.g., LIDAR) and they lie in areas where that source has poor positioning (e.g., urban canyons for terrestrial data).

In one embodiment, the system 100 determines the number of ground control points 101 that need to be sampled (e.g., based on one or more accuracy requirements, size and/or resolution of the collected satellite images, etc.). By way of example, the system 100 may determine that the number is between 3 and 10 points depending on the context. In one embodiment, the system 100 then determines the ideal geographic distribution of the ground control points 101 being sampled for the purpose of the camera model adjustment in consideration. For example, correction of rational polynomial coefficients model is most effective when the ground control points are uniformly distributed through an image. Performing Determinantal Point Process sampling would be best in that case since it maximizes the geographic distance between the sampled points. On the other hand, for rigorous camera models, the optimal distribution of ground control points is around the boundary of the area of interest (e.g., area 103).

In one embodiment, the system 100 performs the sampling with the identified method and reports back the locations of the sampled points and associated satellite images for identification purposes. It is contemplated that the locations determined by the system 100 through the sampling have been obtained using inaccurate satellite camera models. Hence, they are expected to be off by a few meters. However, for collection purposes, that much granularity is enough. Further, in the case where a high-fidelity source (e.g., a camera and/or a LIDAR sensor) is being used for control, all the captures that are found in a few meters radius of the reported points could be scouted for marking the sample points. Again, the associated error with the sampled points is acceptable. Consequently, the system 100 can automatically recommend ground control points for satellite image correction in a cost effective and scalable manner.

Figure 2:
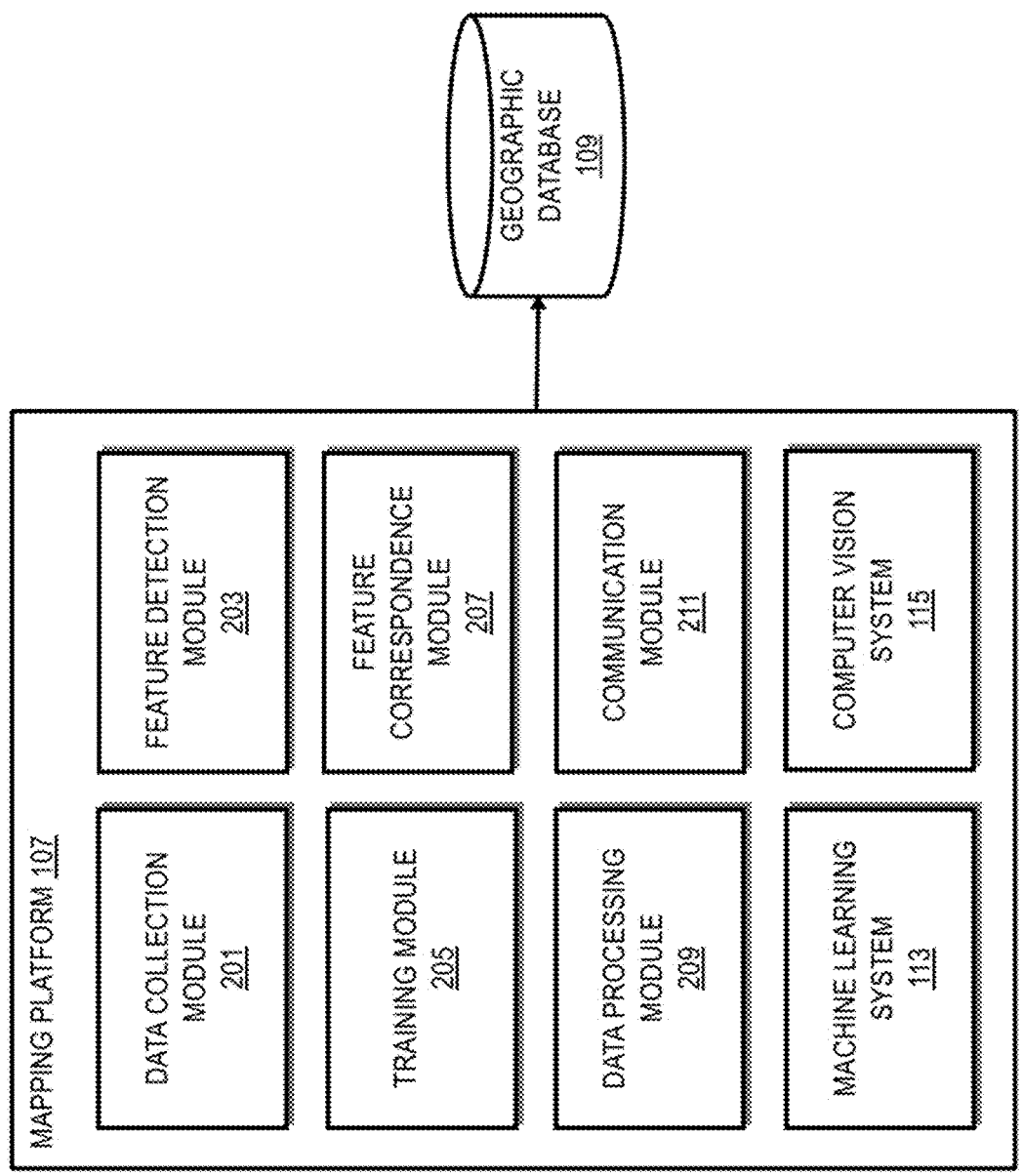
FIG. 2 is a diagram of components of a mapping platform capable of automatically recommending ground control areas/features for image correction, according to one embodiment.

FIG. 2 is a diagram of the components of the mapping platform 107, according to one embodiment. By way of example, the mapping platform 107 includes one or more components for automatically recommending ground control areas/features for image correction, according to the various embodiments described herein. It is contemplated that the functions of these components may be combined or performed by other components of equivalent functionality. In one embodiment, the mapping platform 107 includes a data collection module 201, a feature detection module 203, a training module 205, a feature correspondence module 207, a data processing module 209, a communication module 211, the machine learning system 113, and the computer vision system 115, all with connectivity to the geographic database 109. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 201-211 may be implemented as a cloud-based service, local service, native application, or combination thereof. The functions of the mapping platform 107 and/or the modules 201-211 are discussed with respect to FIGS. 3 and 5.

Figure 3:
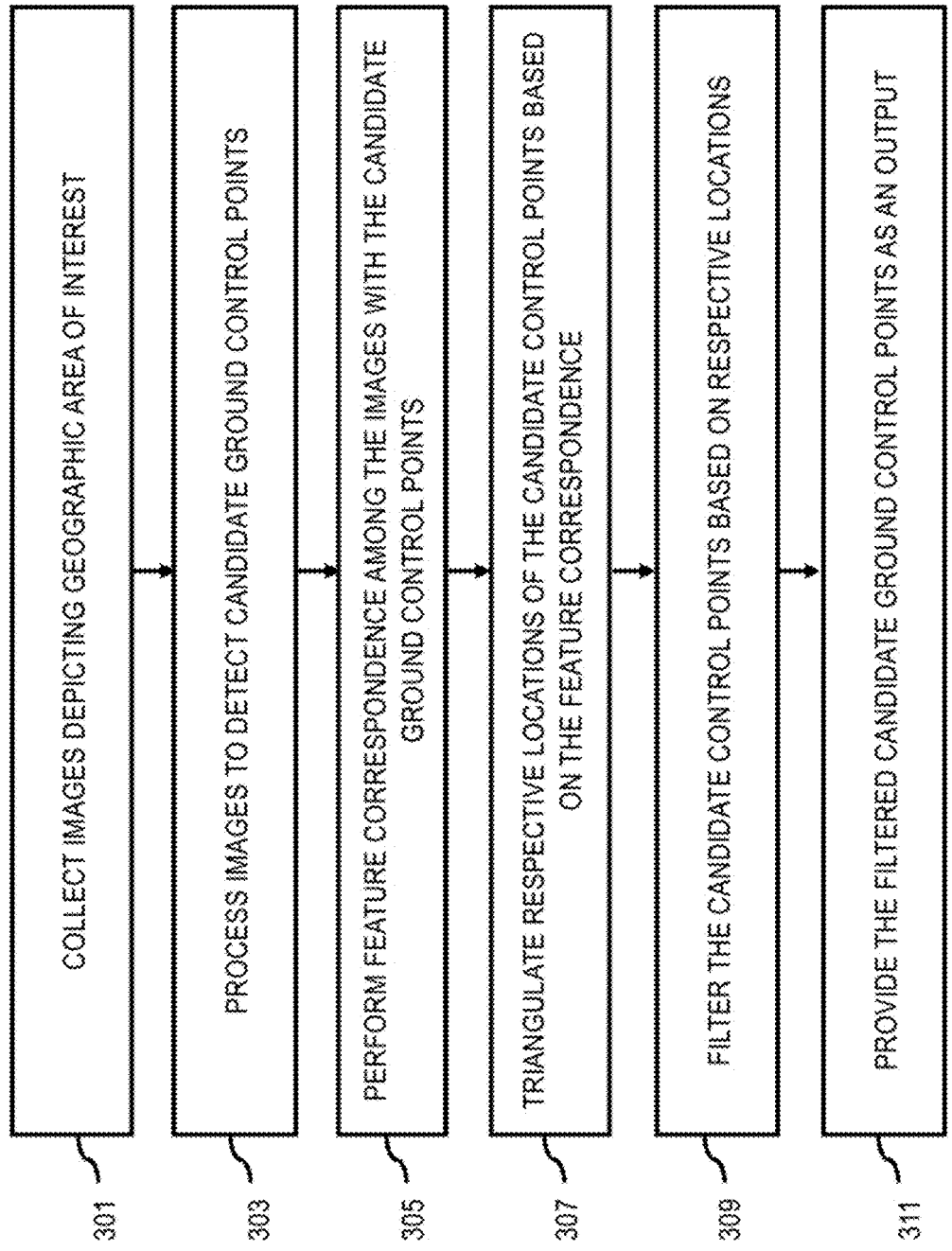
FIG. 3 is a flowchart of a process for automatically recommending ground control points for image correction, according to one embodiment.
Figure 9:
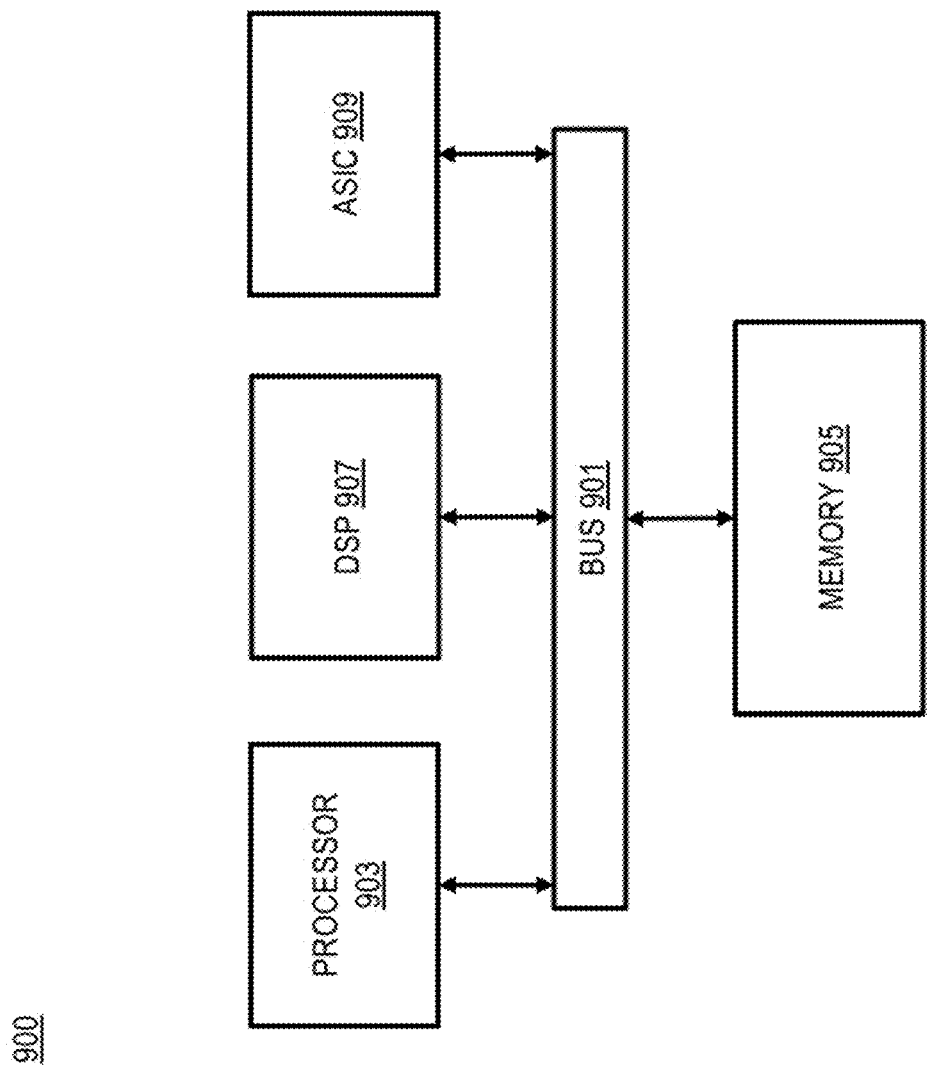
FIG. 9 is a diagram of a chip set that can be used to implement an embodiment.

FIG. 3 is a flowchart of a process for automatically recommending ground control ground control points for image correction, according to one embodiment. In various embodiments, the mapping platform 107, the machine learning system 113, the computer vision system 115, and/or any of the modules 201-211 may perform one or more portions of the process 300 and may be implemented in, for instance, a chip set including a processor and a memory as shown in FIG. 9. As such, the mapping platform 107, the machine learning system 113, the computer vision system 115, and/or the modules 201-211 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

In step 301, the data collection module 201 collects a plurality of images depicting a geographic area of interest. In one embodiment, the plurality of images includes top-down imagery. By way of example, the top-down images may comprise satellite images (e.g., taken by one or more of the satellites 105), aerial images (e.g., taken by one or more airplanes, drones, helicopters, high altitude balloons, etc.), or a combination thereof. In one instance, the area of interest may be a complicated urban environment (e.g., a city center) with many occluding objects (e.g., large buildings, narrow streets, etc.) blocking a vehicle (e.g., an autonomous vehicle) or user's perceptual horizon. In one embodiment, the data collection module 201 can collect the images from a vendor archive (e.g., a geographic database 109). In another embodiment, the vendor archive may be associated with one or more content providers 117a-117m, one or more services 119a-119n of the services platform 121, or a combination thereof.

In one embodiment, for example, the images may be derived from one or more sensors 123a-123n (also collectively referred to as sensors 123) (e.g., a camera sensor, a Light Detection and Ranging (LiDAR) sensor, a RADAR sensor, etc.) associated with one or more vehicles 125a-125n (also collectively referred to herein as vehicles 125) (e.g., autonomous, highly assisted driving (HAD), or semi-autonomous vehicles) having connectivity to the mapping platform 107 via the communication network 111. Although the vehicles 125 are depicted as automobiles, it is contemplated that the vehicles 125 may be any type of vehicle capable of including a sensor 123 (e.g., a car, a truck, a motorcycle, a bike, a scooter, etc.). In one embodiment, one or more user equipment (UE) 127a-127n (also collectively referred to as UEs 127) (e.g., a mobile device, a smartphone, etc.) may be used by the system 100 to acquire an accurate model of the environment using sensing systems like cameras and running perception algorithms on the acquired data (e.g., by executing one or more applications 129a-129n). Processing ground sources generally requires more effort and resources to do a larger scale city level collection, but the resulting images can be used to detect features (e.g., candidate ground control points) as well as features such as traffic lights, signs, etc. which may not be visible from an aerial or satellite image.

In step 303, the feature detection module 203 processes the plurality of images (e.g., satellite images) to detect one or more candidate ground control points. By way of example, the category of curvilinear geometry intersections such as gore points, crosswalk corners, and boundaries of limit lines and lane boundaries are great candidates for ground control points. In addition, other distinguishable features on the earth can also function as ground control points for the purposes herein if they can be automatically detected. In other words, the one or more candidate ground control points are all the possible ground control points identifiable in the images.

In one embodiment, the feature detection module 203 interacts with the training module 205, the machine learning system 113, and/or the computer vision system 115 to automatically detect the one or more candidate ground control points using deep networks or other machine learning approaches. In one embodiment, once the training module 205 has defined a candidate ground control point, a large set of annotated or human-created observations (e.g., ground truth images of intersection features) could be obtained from processing the plurality of images (e.g., satellite images). In one instance, the output of this process is a set of ground truth images labeled with candidate ground control points.

In one embodiment, the training module 205 can present this ground truth image data to a machine learning model (e.g., a support vector machine (SVM), neural network, decision tree, etc.) of the machine learning system 113 during training using, for instance, supervised deep convolutional networks or equivalents. In other words, the training module 205 trains a machine learning model using the plurality of images to identify candidate ground control points depicted in the collected images (i.e., inputs). Generally, a machine learning model (e.g., a neural network, set of equations, rules, decision trees, etc.) is trained to manipulate an input feature set to make a prediction about the feature set or the phenomenon/observation that the feature set represents. In one embodiment, the training features for the machine learning model include the determined locations of the feature points in the ground truth satellite images.

In step 305, the feature correspondence module 207 performs a feature correspondence of the one or more candidate feature points (e.g., ground control points) across the plurality of images. In one embodiment, the feature correspondence module 207 identifies the same candidate ground control point (e.g., one or more corresponding pixels) across multiple images (e.g., satellite images). In one instance, the feature correspondence module 207 performs the feature correspondence using one or more automatic feature correspondence techniques. In one embodiment, after the one or more candidate ground control points are detected by the feature detection module 203, the training module 205 can label the plurality of images with known pixel location data indicating which pixel(s) of a ground truth image correspond to ground control points that are present in the image. In one embodiment, the feature correspondence module 207 can then use the known pixel location data to determine feature correspondences between multiple images to determine real world three-dimensional locations of a ground control point (e.g., intersection feature) comprising a latitude, a longitude, and an elevation.

In step 307, the data processing module 209 triangulates respective locations of the one or more candidate ground control points based on the feature correspondence. In one embodiment, the 3D position of the candidate ground control points can then be determined via a triangulation process from the pixel correspondences of each candidate ground control point in combination with a camera model or camera pose (e.g., camera position, pointing direction, etc.) of the camera system used to capture the image (e.g., a satellite 105). By way of example, the triangulation process can use the known camera location, pointing direction, and/or other camera attributes (e.g., focal length, etc.) indicated in the camera model or pose information to triangulate the real-world location of the candidate ground control point from the known camera locations of different images in which the ground control is labeled (e.g., labeled according to the embodiments of the automated machine learning process described above).

In step 309, the data processing module 209 filters the one or more candidate feature points (e.g., ground control points) based on the respective locations. In one embodiment, the filtering of the one or more candidate ground control points by the data processing module 209 comprises filtering out the one or more candidate ground control points associated with the respective locations determined to be within an area that is outside of a collectible range (e.g., if they need to be collected by ground surveyors). By way of example, an area may be outside of the collectible range if the feature point (e.g., ground control point) is on private property, government property, etc. such that entrance on the property to measure the location requires special access permission. Likewise, an area may be outside of the collectible range if the terrain is likely hazardous to the safety of a surveyor (e.g., a rocky cliff). In one instance, the filtering of the one or more candidate ground control points by the data processing module 209 comprises filtering out the one or more candidate ground control points associated with the respective locations determined to be within an area that has a positioning accuracy below a threshold accuracy. By way of example, if the ground control is done using another high-fidelity source (e.g., GPS) and the candidate control points are in areas where that source has poor positioning (e.g., an urban canyon such as Time Square in New York), then those ground control points are filtered out from the one or more candidate ground control points.

In one embodiment, the filtering of the one or more candidate ground control points is further based on the data processing module 209 determining how many of the candidate ground control points need to be sampled. By way of example, the number may be based on one or more accuracy requirements, the size of the geographic area of interest, the volume of collected images, the resolution of the collected images, the quantity of candidate ground control points, etc. In many instances, the number is likely greater than 3 but less than 10.

In one instance, the filtering of the one or more candidate control points is further based on the feature detection module 203 determining a geographic distribution of the one or more candidate ground control points for a camera model adjustment. In one embodiment, the camera model adjustment comprises adjusting one or more camera pose parameters, optical characteristic parameters, or a combination thereof of at least one camera used to capture the plurality of images. By way of example, correction of rational polynomial coefficients models is most effective when the candidate ground control points are uniformly distributed through an image. In one embodiment, the detected geographic distribution maximizes respective geographic distances between the one or more sampled candidate ground control points (e.g., based on a determinantal point process sampling). In one instance, the geographic distribution is detected around a boundary of the geographic area of interest (e.g., for rigorous camera models).

In step 311, the communication module 211 provides the filtered one or more candidate ground control points (e.g., via a UE 127 such as a mobile device) as an output comprising one or more recommended ground control points. By way of example, the one or more recommend ground control points can be used to adjust each pixel and correlated map feature within the plurality of images of the geographic area of interest. In one embodiment, the data processing module 209 initiates a sampling of the one or more recommended ground control points in the output and the communication module 211 reports the respective locations, corresponding images of the plurality of images, or a combination thereof of the sampled one or more recommended ground control points. In one instance, the data collection module 201 retrieves a set of the plurality of images within a threshold distance of the reported respective locations based on the data processing module 209 determining that the plurality of images is from a source with a location accuracy above a threshold accuracy (e.g., where a high-fidelity source is being used for ground control). In one embodiment, the feature detection module 203 thereafter initiates a detection, a marking, or a combination thereof of the sampled one or more recommended ground control points in the set of the plurality of images.

Figure 4:
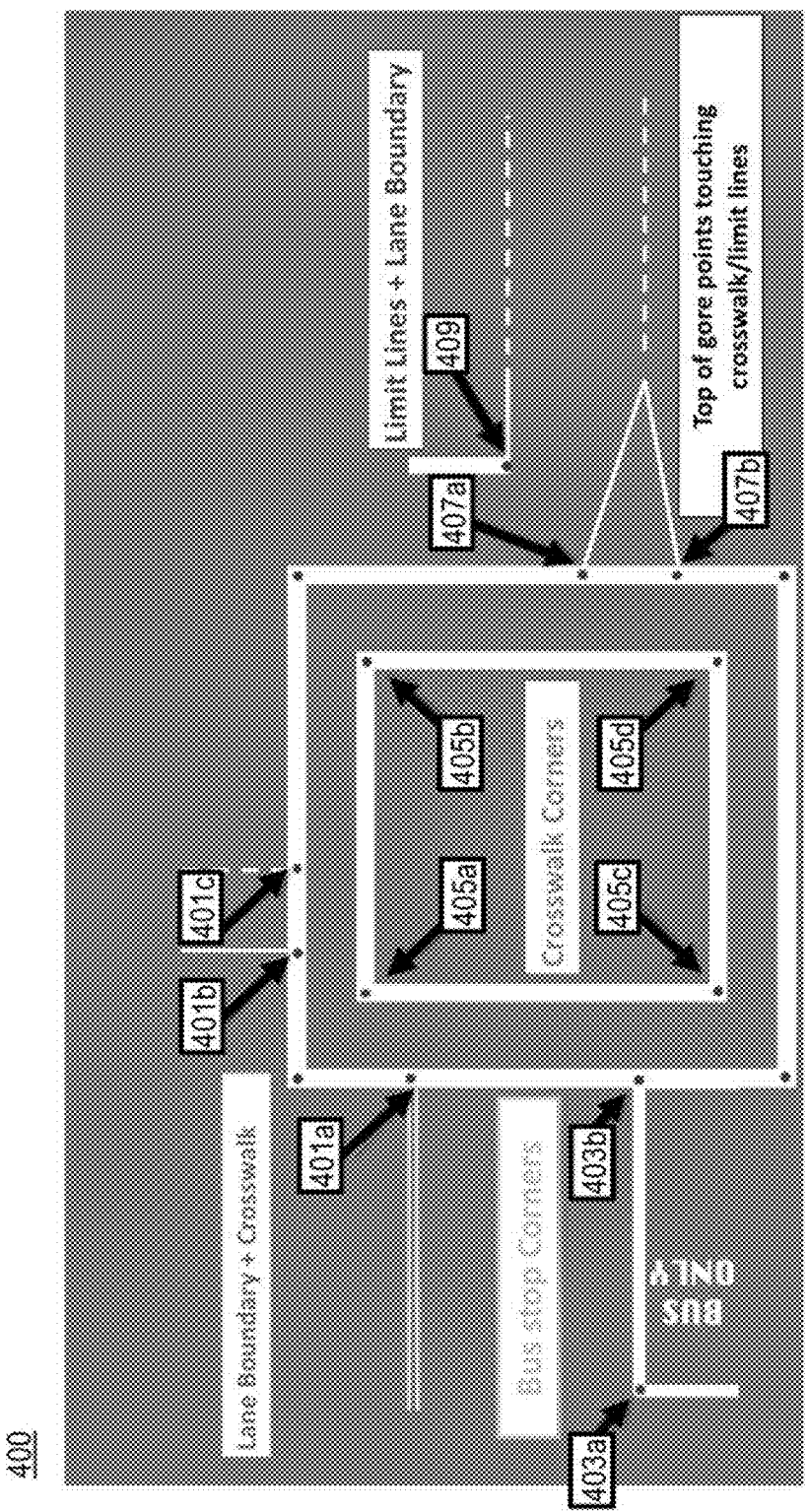
FIG. 4 is a diagram illustrating example intersection features, according to one embodiment.

FIG. 4 is a diagram illustrating example intersection features or feature points that are great candidates for ground control points, according to one embodiment. The example of FIG. 4 illustrates a schematic drawing of a typical intersection 400 at which intersection features created by various geometries of the lane lines, crosswalks, bus stops, and/or any other identifiable object or marking found at the intersection 400. An intersection refers, for instance, to a geographic area at which two or more road segments intersect, converge, and/or diverge. As shown, intersection features in the category of curvilinear geometry include but are not limited to:

(1) Points 401a-401c corresponding to where a lane boundary (e.g., lane line or marking) meets a crosswalk;

(2) Points 403a and 403b corresponding to the corners of road markings indicating a bus stop;

(3) Points 405a-405d corresponding to the corners of a crosswalk;

(4) Points 407a and 407b corresponding to the top of gore points touching a crosswalk or limit lines (e.g., lines designating the limit or boundaries of other features such as lanes); and (5) Point 409 corresponds to the point where a limit line meets a lane boundary.

The intersection features identified above typically meet the criteria or properties for being classified as ground control points.

In another embodiment, the intersection feature is selected based on determining that the intersection feature has a spatial sparsity that meets a sparsity criterion (e.g., see designated property item (3) above). Features or feature points that repeat often within a designated area (i.e., not sparse or appear in numbers greater than the sparsity threshold) are not well suited as ground control points because they can be more difficult to uniquely identify and/or match against known ground control points. For example, features such as dashes of a lane line, stripes in a crosswalk, multiple line paint intersections in restricted zones, zebra stripes, etc. that repeat often over small distances can be poor ground control point candidates.

Figure 5A:
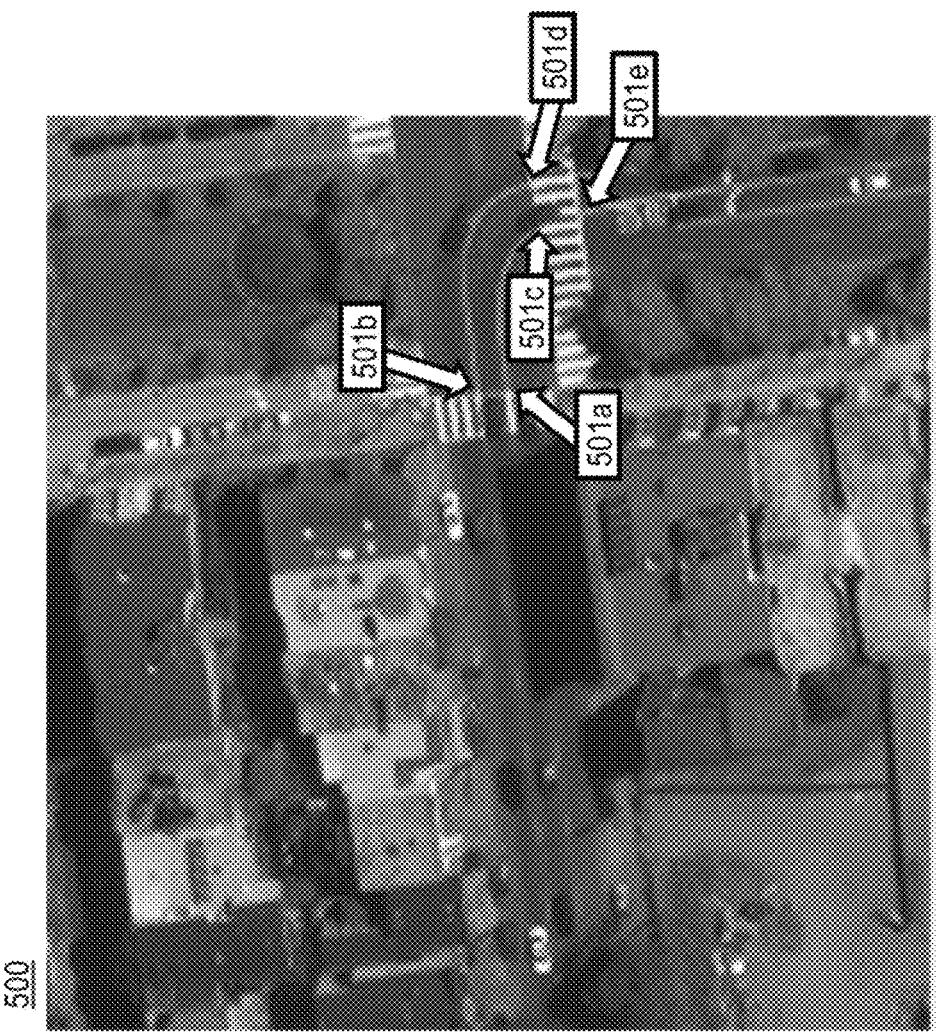
FIGS. 5A-5C are diagrams illustrating example imagery of intersection features, according to one embodiment.
Figure 5B:
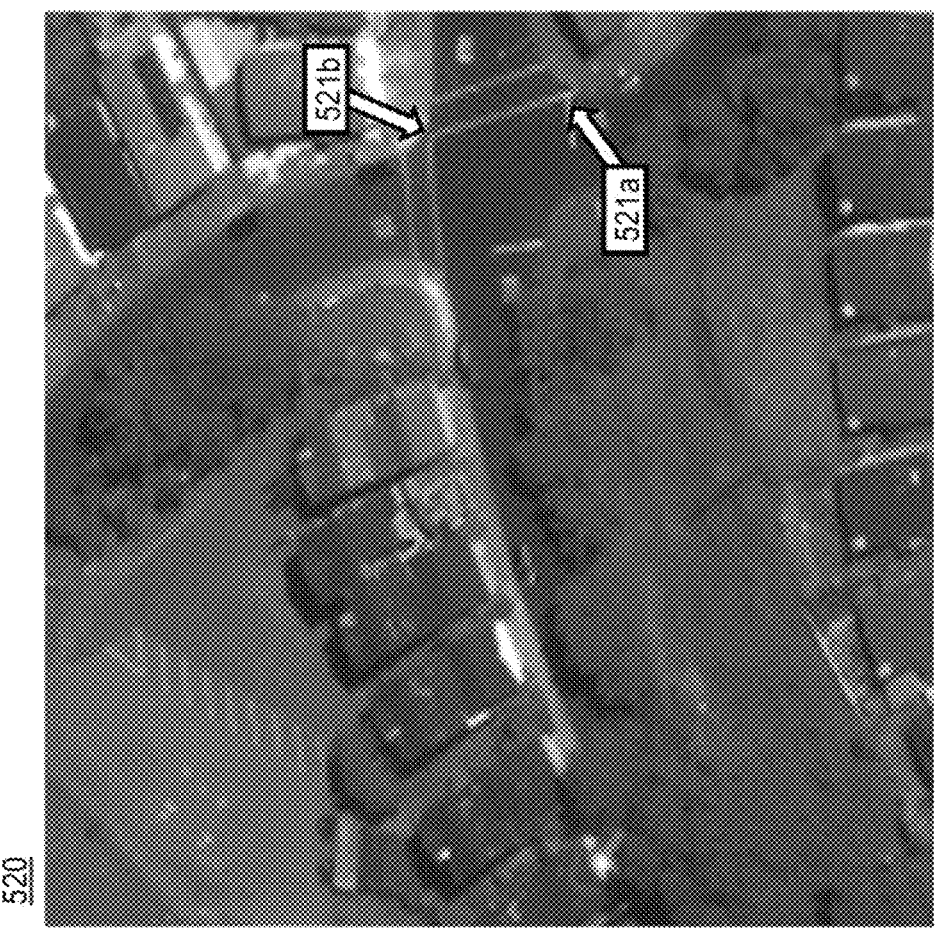
Figure 5C:

FIGS. 5A-5C illustrate example imagery of some of the intersection features illustrated in FIG. 4, according to one embodiment. For example, FIG. 5A illustrates a satellite image 500 that depicts ground control points 501a-501e at which a lane boundary meets a crosswalk. FIG. 5B illustrates a satellite image 520 that depicts ground control points 521a and 521b that are crosswalk corners. FIG. 5C illustrates a satellite image 540 that depicts ground control points 541a and 541b at which a limit line meets a lane line. Each of the ground control points illustrated in FIGS. 5A-5C are an intersection feature or feature point from a category of curvilinear geometry intersection features that are also often visible from satellite images.

After selecting the features that are to be designated as ground control points, the feature detection module 203 can label and/or retrieve a plurality of ground truth images depicting the intersection feature. In one embodiment, the plurality of ground truth images is labeled with known pixel location data of the intersection as respectively depicted in each of the plurality of ground truth images. The known pixel location data indicate which pixel(s) of a ground truth image correspond to ground control points that are present in the image. As previously described, the known pixel location data can be used to determine pixel correspondences between multiple images and to determine real world three-dimensional locations of the candidate ground control point (e.g., intersection feature) comprising a latitude, longitude, and elevation. The ground truth images can also include multiple images of the same ground control point or learnable feature (e.g., captured at different times, from different sources, etc.).

In one embodiment, to determine or label pixel location data, the feature detection module 203 can process the images using image recognition or equivalent to identify the pixels of each image corresponding to the selected features/ground control points. In other words, following the identification of candidate feature points in several top down images, corresponding image pixel locations are identified. In one embodiment, for each real-world feature (e.g., line intersection), the corresponding pixel coordinates in two or more images are recorded, creating a pixel correspondence of the form $\{(u_1, v_1), (u_2, v_2), \ldots\}$ or equivalent. Here, u and v are pixel locations of the same physical object or feature depicted in the images (e.g., pixel locations along the x and y axis respectively of a pixel grid comprising the image), and the subscript indicates in which image the feature is labeled.

Figure 6A:
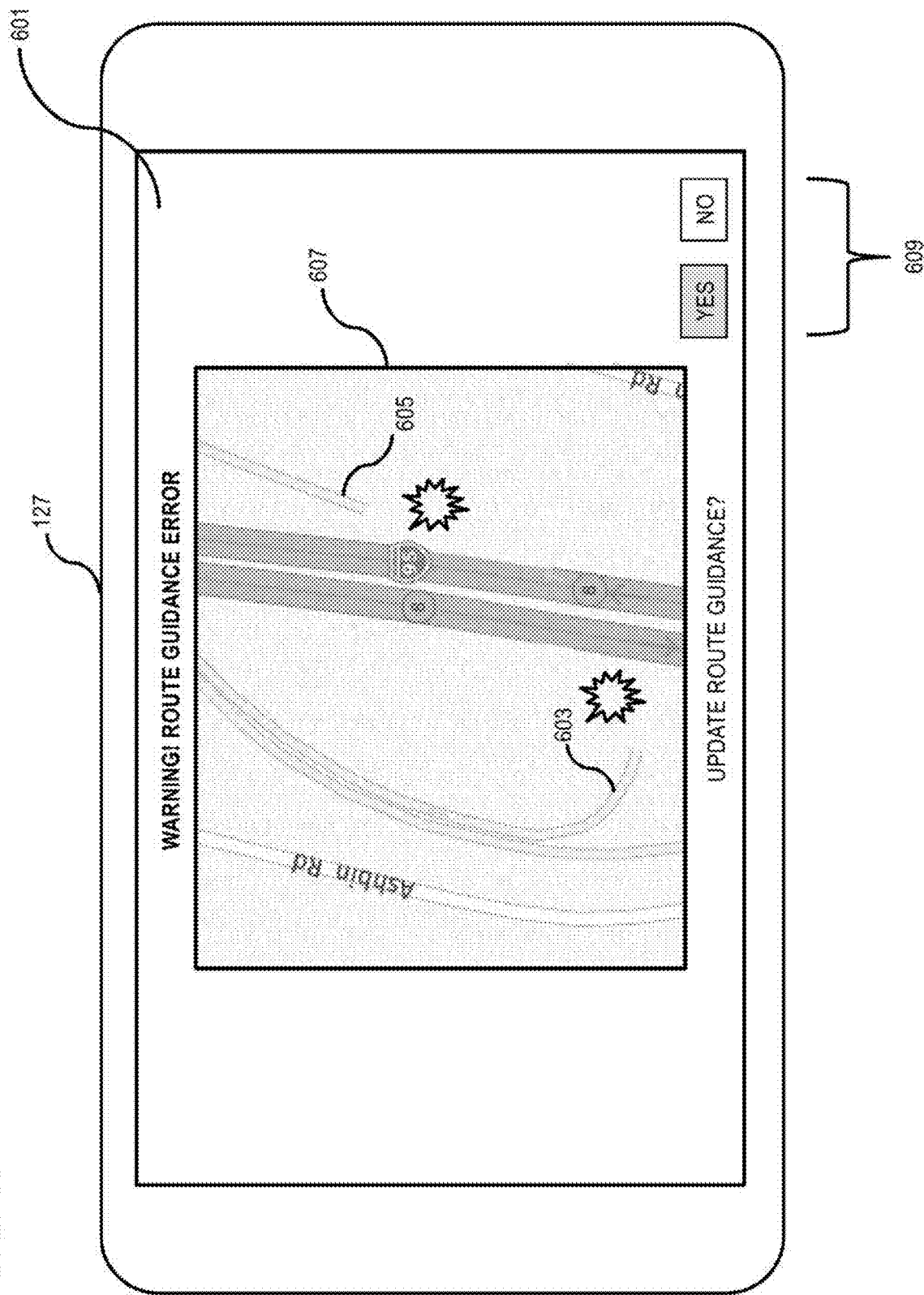
Figure 6C:
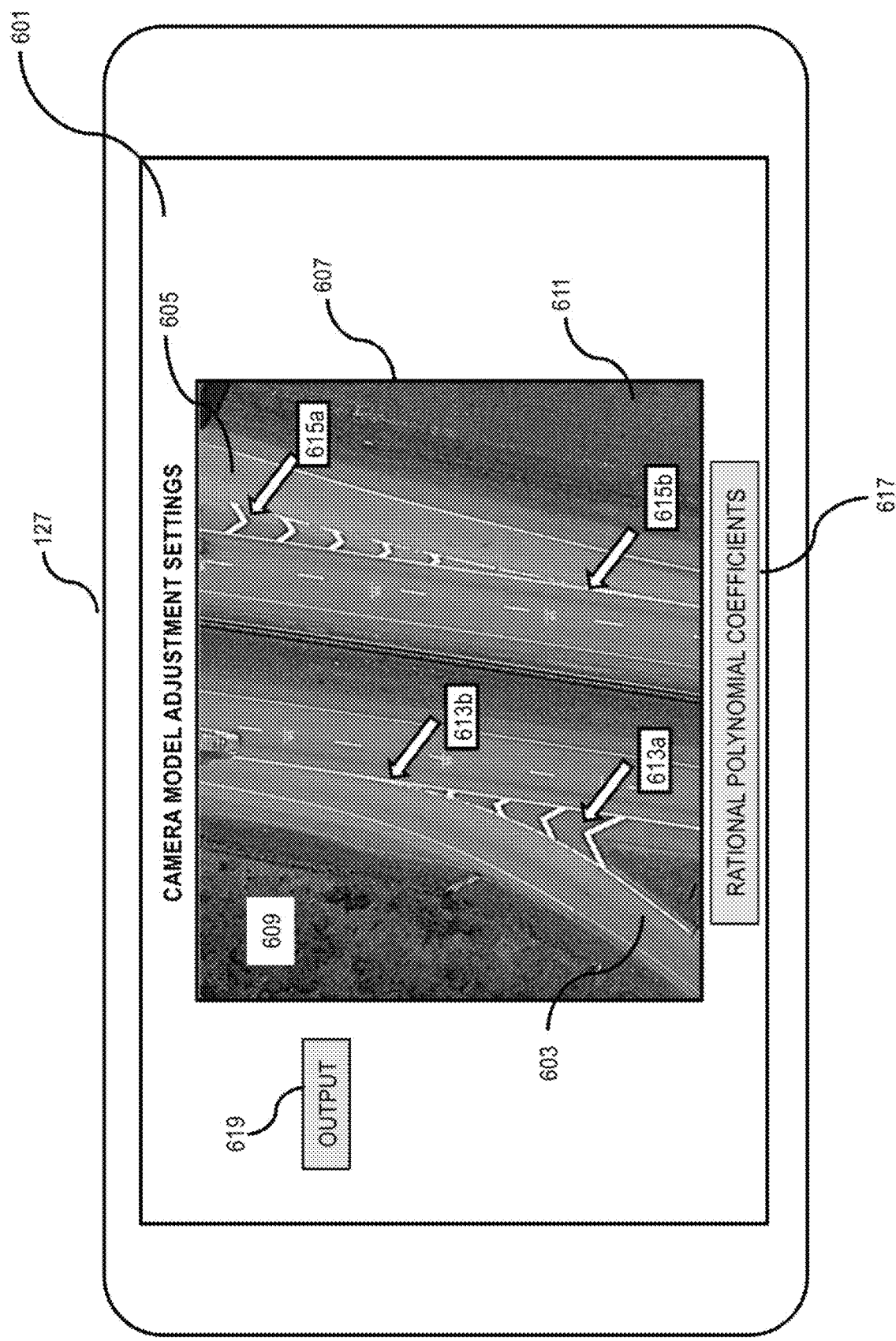

FIGS. 6A through 6C are diagrams of example use interfaces for automatically recommending ground control areas/features (e.g., ground control points) for satellite image correction, according to one embodiment. In this example, a UI 601 is generated for a UE 127 (e.g., a mobile device, a laptop computer, etc.) that enables a user to access an application (e.g., a navigation application 129) for developing an autonomous vehicle guidance system. As described above, up-to-date high-resolution maps and extremely accurate models of an environment (e.g., a complex road network) are required to ensure that autonomous vehicles (e.g., a vehicle 125) can safely enter and/or exit a busy interstate highway (e.g., Interstate 95). In this example, the user or the system 100 can detect that one or more errors occurred with respect to the entry and/or exits between roads 603 and 605 and Interstate 95 within the area of interest 607 and, therefore, could pose a danger to an autonomous vehicle and/or other persons or vehicles in that area. In this example, as in most instances, the user is also unable to physically map the respective connections between roads 603 and 605 and Interstate 95, nor does the user have the resources (e.g., time and money) to task surveyors to go out in the field to measure the required location data. Rather, it is contemplated that in some situations (e.g., while riding in an autonomous vehicle) an updated route guidance may be needed in real-time or substantially real-time (e.g., while temporarily stopped on the side of a road).

In one embodiment, to update or to correct the map 607, the system 100 can generate the UI 601 such that it includes an input 609 to enable a user to initiate the sampling process of the system 100, as described above. By way of example, the user can interact with the input 609 via one or more physical interactions (e.g., a touch, a tap, a gesture, typing, etc.), one or more voice commands (e.g., "yes," "update map," "recalculate," etc.), or a combination thereof. It is contemplated that in certain circumstances, the system 100 may automatically initiate a route guidance update to ensure safety of the autonomous vehicle and other persons or vehicles in the area.

In one embodiment, the system 100 can collect all the satellite images from a vendor archive (e.g., the geographic database 109) for the area of interest 607. Although the resulting resolution and/or accuracy of the satellite images for the given area 607 may be enough for a user or a driver to distinguish between the roads (e.g., roads 603, 605, and Interstate 95) and the trees 609, parking lot 611, etc.; the accuracy or resolution is insufficient for autonomous vehicle guidance, hence the warning "Resolution Too Low." As described above, feature points (e.g., ground control points, one or more corresponding pixels, or a combination thereof) can be used to correct the satellite images.

In one embodiment, the system 100 automatically detects the ground control points 613a and 613b (e.g., the start and end of the gore points between road 603 and Interstate 95)

and the ground control points 615a and 615b (e.g., the start and end of the gore points between road 605 and Interstate 95). In one instance, the system 100 can then correspond the ground control points 613a, 613b, 615a, and 615b across the previously collected satellite images of the area 607 (e.g., using automatic features correspondence techniques) and triangulate their location.

Referring to FIG. 6C, in one embodiment, the system 100 can generate the UI 601 such that it includes an input 617 to enable a user to manually enter, select, scroll through, etc. one or more camera model adjustment settings (e.g., rational polynomial coefficients, determinantal point process, etc.) based on the number and geographic distribution of the detected ground control points and/or other relevant criteria (e.g., available compute power). It is contemplated that the system 100 would produce an error notification in the UI 601 in instances where the user has selected an adjustment setting that is incongruent with the number needed to be sampled and/or the geographic distribution of the ground control points. In one instance, the system 100 can simply utilize the adjustment setting that yields the most accurate results based on the task (e.g., updating an autonomous vehicle navigation route). In one embodiment, the system 100 can then automatically output or report back the locations of the sampled ground control points (e.g., 613b and 615b) and associated satellite images for identification purposes. In one instance, the output may be based on one or more user-based interactions with the input 619. Like the functionality of input 609, it is contemplated that a user can interact with the inputs 617 and 619 via one or more physical interactions, one or more voice commands, or a combination thereof.

Returning to FIG. 1, in one embodiment, the mapping platform 107 performs the process for automatically recommending ground control areas/features (e.g., ground control points) for image correction (e.g., satellite image correction) as discussed with respect to the various embodiments described herein. In one embodiment, the mapping platform 103 can be a standalone server or a component of another device with connectivity to the communication network 111. For example, the component can be part of an edge computing network where remote computing devices (not shown) are installed along or within proximity of an intended destination (e.g., a complicated urban environment).

In one embodiment, the machine learning system 113 of the mapping platform 107 includes a neural network or other machine learning system to make predictions and/or recommendations from machine learning models. For example, when the inputs to the machine learning model are satellite images with camera pose data of features or feature points (e.g., candidate ground control points) with known physical locations used for the embodiments described herein, the output can include one or more recommended ground control points for satellite image correction. In other words, the output can include which points are needed to be collected or marked. In one embodiment, the neural network of the machine learning system 113 is a traditional convolutional neural network which consists of multiple layers of collections of one or more neurons (which are configured to process a portion of an input image). In one instance, the machine learning system 113 and/or the computer vision system 115 also have connectivity or access over the communication network 111 to the geographic database 109 which can store the imagery (e.g., satellite images) for an area of interest.

In one embodiment, the mapping platform 107 has connectivity over the communication network 111 to the services platform 121 (e.g., an OEM platform) that provides the one or more services 119a-119n (also collectively referred to herein as services 119). By way of example, the services 119 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 119 use the output of the mapping platform 107 (e.g., recommended ground control points) to localize a vehicle 125 (e.g., an autonomous vehicle) or a UE 127 (e.g., a portable navigation device, smartphone, portable computer, tablet, etc.) and/or provide services 119 such as navigation, mapping, other location-based services, etc.

In one embodiment, the mapping platform 107 may be a platform with multiple interconnected components. The mapping platform 107 may include multiple servers, intelligent networking devices, computing devices, components and corresponding software for providing parametric representations of lane lines. In addition, it is noted that the mapping platform 107 may be a separate entity of the system 100, a part of the one or more services 119, a part of the services platform 121, or included within a UE 127 and/or a vehicle 125.

In one embodiment, the content providers 117a-117m (collectively referred to as content providers 117) may provide content or data (e.g., including satellite, aerial, and/or terrestrial-based data, geographic data, parametric representations of mapped features, etc.) to the geographic database 109, the mapping platform 107, the services 119, the services platform 121, the vehicles 125, the UEs 127, and/or the applications 129a-129n (also collectively referred to herein as application 129). The content provided may be any type of content, such as map content, textual content, audio content, video content, image content, etc. In one embodiment, the content providers 117 may provide content that may aid in the detecting and classifying curvilinear geometry intersections and/or other features (e.g., ground control points) in the image data and in estimating the quality of the detected features. In one embodiment, the content providers 117 may also store content associated with the mapping platform 107, the geographic database 109, the machine learning system 113, the computer vision system 115, services 119, the services platform 121, the vehicles 125, and/or the UEs 127. In another embodiment, the content providers 117 may manage access to a central repository of data, and offer a consistent, standard interface to data, such as a repository of the geographic database 109.

In one embodiment, a UE 127 and/or a vehicle 125 may execute a software application 129 to capture image data or other observation data for automatically recommending ground control areas/features for terrestrial-based image correction according to the embodiments described herein. By way of example, the applications 129 may also be any type of application that is executable on a UE 127 and/or a vehicle 125, such as autonomous driving applications, mapping applications, location-based service applications, navigation applications, content provisioning services, camera/imaging applications, media player applications, social networking applications, calendar applications, and the like. In one embodiment, the applications 129 may act as a client for the mapping platform 107 and perform one or more functions associated with recommending ground control areas/features alone or in combination with the machine learning system 113.

By way of example, the UEs 127 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 127 can support any type of interface to the user (such as "wearable" circuitry, etc.). In one embodiment, a UE 127 may be associated with a vehicle 125 or be a component part of the vehicle 125 (e.g., an embedded navigation system).

In one embodiment, the UEs 127 and/or the vehicles 125 are configured with various sensors (e.g., sensors 123) for generating or collecting environmental image data (e.g., for processing by the mapping platform 107), related geographic data, etc. In one embodiment, the sensed data represents sensor data associated with a geographic location or coordinates at which the sensor data was collected. By way of example, the sensors may include a global positioning sensor (GPS) for gathering location data, LIDAR, RADAR, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UEs 127 and/or the vehicles 125 (e.g., sensors 123) may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of a UE 127 and/or a vehicle 125 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, a UE 127 and/or a vehicle 125 may include GPS or other satellite-based receivers to obtain geographic coordinates from satellites (e.g., one or more of the satellites 105) for determining current location and time. Further, the location can be determined by visual odometry, triangulation systems such as A-GPS, Cell of Origin, or other location extrapolation technologies. In yet another embodiment, the sensors (e.g., one or more sensors 123) can determine the status of various control elements of the car, such as activation of wipers, use of a brake pedal, use of an acceleration pedal, angle of the steering wheel, activation of hazard lights, activation of head lights, etc.

In one embodiment, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the satellites 105, mapping platform 107, machine learning system 113, computer vision system 115, content providers 117, services 119, services platform 121, vehicles 125, and/or UEs 127 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
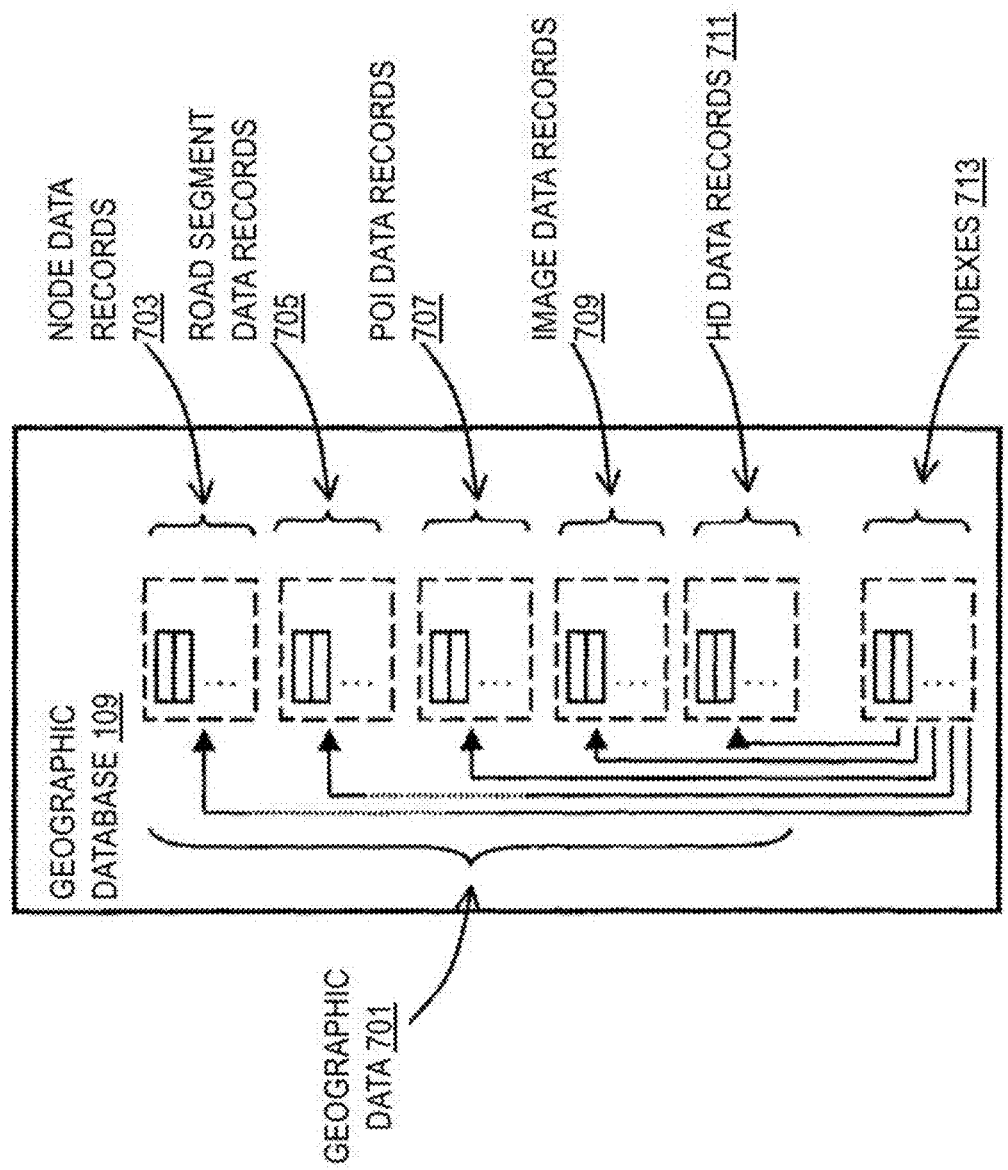
FIG. 7 is a diagram of a geographic database, according to one embodiment.

FIG. 7 is a diagram of a geographic database, according to one embodiment. In one embodiment, the geographic database 109 includes geographic data 701 used for (or configured to be compiled to be used for) mapping and/or navigation-related services, such as for video odometry based on the mapped features (e.g., lane lines, road markings, signs, etc.). In one embodiment, the geographic database 109 includes high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 703, road segment or link data records 705, POI data records 707, image data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 109. In one embodiment, the indexes 713 may be used to quickly locate data without having to search every row in the geographic database 109 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles (e.g., vehicles 125), cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 707. The geographic database 109 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 109 can also include image data records 709 for accessing all available satellite images, aerial images, terrestrial-based images covering an area of interest. By way of example, the image data records 709 may enable access to one or more vendor archives. In one embodiment, the image data records 709 also include identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. By way of example, the image data records 709 can be associated with one or more of the node records 703, road segment records 705, and/or POI data records 707 to support localization or visual odometry based on the features (e.g., ground control points) stored therein and the corresponding estimated quality of the features. In this way, the records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 125 (e.g., autonomous vehicles) and other end user devices (e.g., a UE 127) with near real-time speed without overloading the available resources of the vehicles 125 and/or the UEs 127 (e.g., computational, memory, bandwidth, etc. resources).

In one embodiment, the HD mapping data records 711 are created from high-resolution 3D mesh or point-cloud data generated, for instance, from LiDAR-equipped vehicles (e.g., one or more vehicles 125). The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field (e.g., one or more vehicles 125). The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 109 can be maintained by a content provider 117 in association with the services platform 121 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle (e.g., a vehicle 125 and/or a UE 127) along roads throughout a geographic area of interest to observe features and/or record information about them, for example. Also, remote sensing, such as aerial or satellite photography (e.g., from the satellites 105), can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 125 or a UE 127, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically recommending ground control areas/features for image correction may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
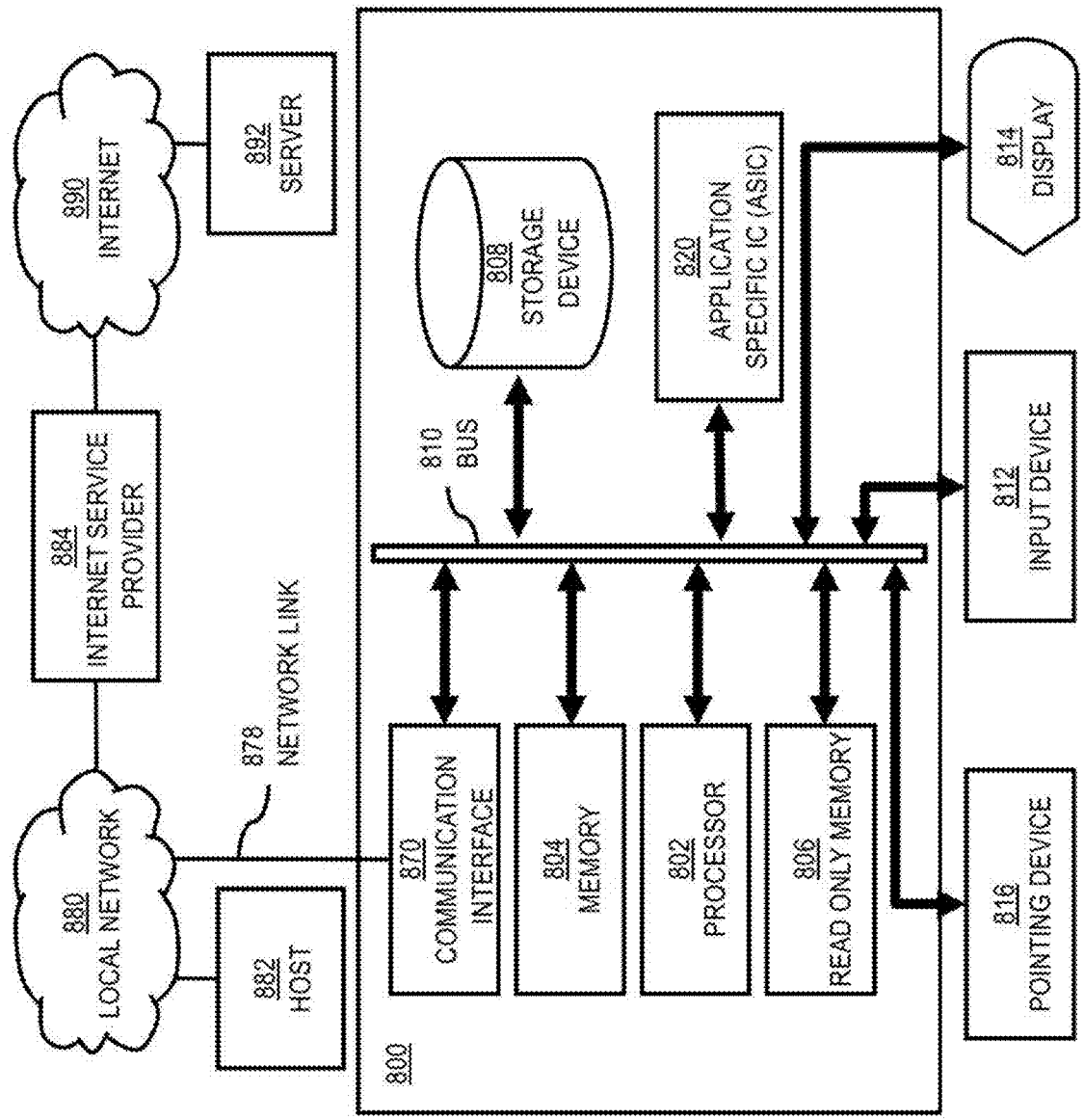
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to automatically recommend ground control areas/features for image correction as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to automatically recommending ground control areas/features for image correction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for automatically recommending ground control areas/features for image correction. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for automatically recommending ground control areas/features for image correction, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for automatically recommending ground control areas/features for image correction.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to automatically recommend ground control areas/features for image correction as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to automatically recommend ground control areas/features for image correction. The memory 905 also stores the data associated with or generated by the execution of the inventive steps.

Figure 10:
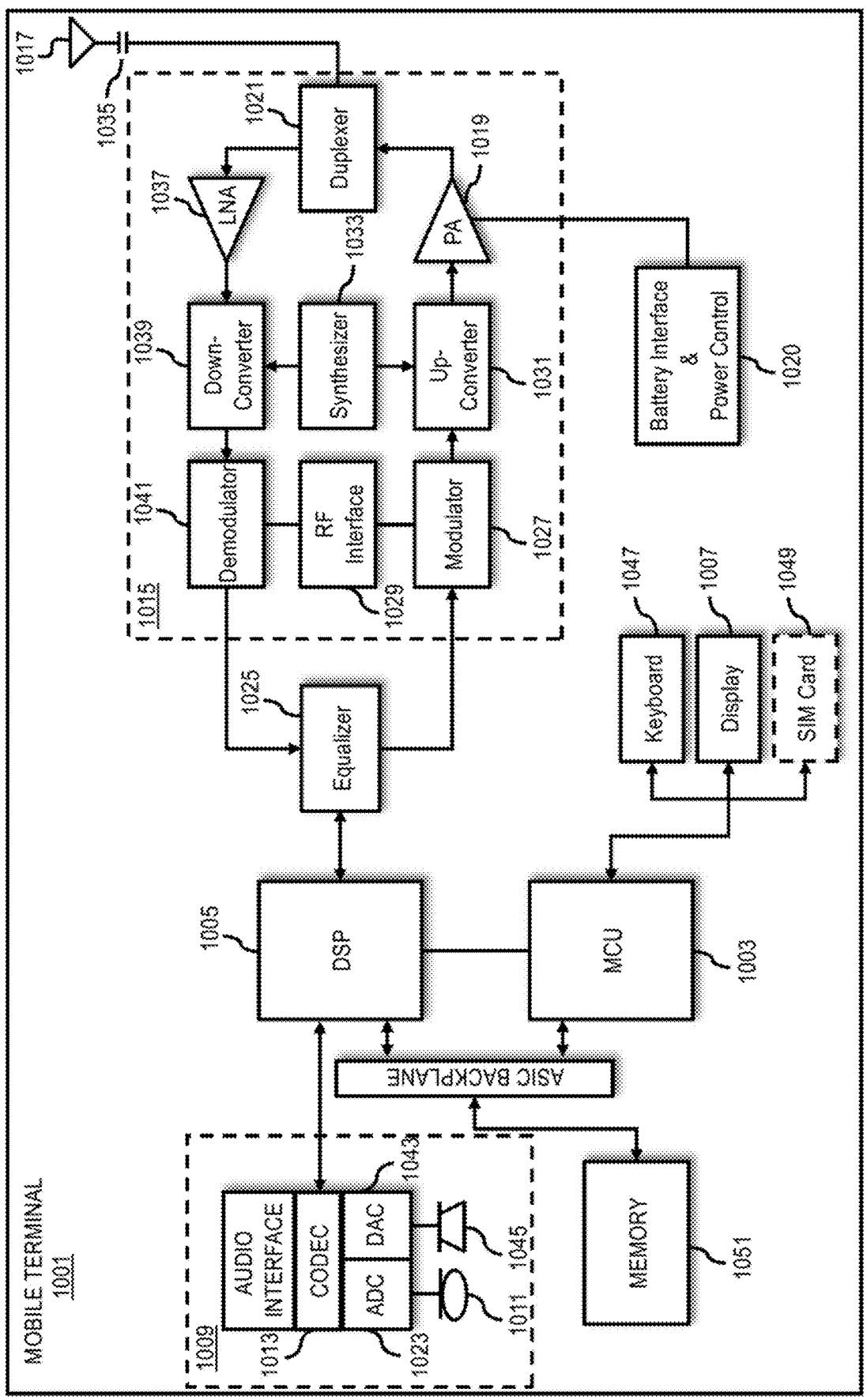
FIG. 10 is a diagram of a mobile terminal (e.g., handset or vehicle or part thereof) that can be used to implement an embodiment.

FIG. 10 is a diagram of exemplary components of a mobile terminal (e.g., a vehicle 125, a UE 127, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the backend encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to automatically recommend ground control areas/features for image correction. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    collecting a plurality of images depicting a geographic area of interest;
    processing the plurality of images to detect one or more candidate ground control points;
    performing a feature correspondence of the one or more candidate ground control points across the plurality of images;
    triangulating respective locations of the one or more candidate ground control points based on the feature correspondence;
    filtering the one or more candidate ground control points based on the respective locations; and
    providing the filtered one or more candidate ground control points as an output comprising one or more recommended ground control points.

2. The method of claim 1, wherein the filtering of the one or more candidate ground control points comprises filtering out the one or more candidate ground control points associated with the respective locations determined to be within an area that is outside of a collectible range.

3. The method of claim 1, wherein the filtering of the one or more candidate ground control points comprises filtering out the one or more candidate ground control points associated with the respective locations determined to be within an area that has a positioning accuracy below a threshold accuracy.

4. The method of claim 1, further comprising:
    determining a number of the one or more candidate ground control points,
    wherein the filtering of the one or more candidate ground control points is further based on the number.

5. The method of claim 1, further comprising:
    determining a geographic distribution of the one or more candidate ground control points for a camera model adjustment,
    wherein the filtering of the one or more candidate ground control points is further based on the geographic distribution.

6. The method of claim 5, wherein the camera model adjustment comprises adjusting one or more camera pose parameters, optical characteristic parameters, or a combination thereof of at least one camera used to capture the plurality of images.

7. The method of claim 5, wherein the geographic distribution maximizes respective geographic distances between the one or more sampled candidate ground control points.

8. The method of claim 5, wherein the geographic distribution distributes the one or more sampled candidate ground control points around a boundary of the geographic area of interest.

9. The method of claim 1, further comprising:
    initiating a sampling of the one or more recommended ground control points in the output; and
    reporting the respective locations, corresponding images of the plurality of images, or a combination thereof of the sampled one or more recommended ground control points.

10. The method of claim 9, further comprising:
    retrieving a set of the plurality of images within a threshold distance of the reported respective locations based on determining that the plurality of images is from a source with a location accuracy above a threshold accuracy; and
    initiating a detection, a marking, or a combination thereof of the sampled one or more recommended ground control points in the set of the plurality of images.

11. The method of claim 1, wherein the plurality of images includes top-down imagery.

12. An apparatus comprising:
    at least one processor; and
    at least one memory including computer program code for one or more programs,
    the at least one memory and the computer program code configured to, with the at least one processor, cause the apparatus to perform at least the following,
    collect a plurality of images depicting a geographic area of interest;
    process the plurality of images to detect one or more candidate feature points;
    perform a feature correspondence of the one or more candidate feature points across the plurality of images;
    triangulate respective locations of the one or more candidate feature points based on the feature correspondence;
    filter the one or more candidate feature points based on the respective locations; and provide the filtered one or more candidate feature points as an output comprising one or more recommended feature points.

13. The apparatus of claim 12, wherein the filter of the one or more candidate feature points comprises filtering out the one or more candidate feature points associated with the respective locations determined to be within an area that is outside of a collectible range.

14. The apparatus of claim 12, wherein the filter of the one or more candidate feature points comprises filtering out the one or more candidate feature points associated with the respective locations determined to be within an area that has a positioning accuracy below a threshold accuracy.

15. The apparatus of claim 12, wherein the apparatus is further caused to:
   determine a number of the one or more candidate feature points,
   wherein the filter of the one or more candidate feature points is further based on the number.

16. The apparatus of claim 12, wherein the apparatus is further caused to:
   determine a geographic distribution of the one or more candidate feature points for a camera model adjustment,
      wherein the filter of the one or more candidate feature points is further based on the geographic distribution.

17. A non-transitory computer-readable storage medium carrying one or more sequences of one or more instructions which, when executed by one or more processors, cause an apparatus to at least perform the following steps:
   collecting a plurality of top-down images depicting a geographic area of interest;
   processing the plurality of top-down images to detect one or more candidate ground control points;
   performing a feature correspondence of the one or more candidate ground control points across the plurality of top-down images;
   triangulating respective locations of the one or more candidate ground control points based on the feature correspondence;
   filtering the one or more candidate ground control points based on the respective locations; and
   providing the filtered one or more candidate ground control points as an output comprising one or more recommended ground control points.

18. The non-transitory computer-readable storage medium of claim 17, wherein the filtering of the one or more candidate ground control points comprises filtering out the one or more candidate ground control points associated with the respective locations determined to be within an area that is outside of a collectible range.

19. The non-transitory computer-readable storage medium of claim 17, wherein the filtering of the one or more candidate ground control points comprises filtering out the one or more candidate ground control points associated with the respective locations determined to be within an area that has a positioning accuracy below a threshold accuracy.

20. The non-transitory computer-readable storage medium of claim 17, wherein the apparatus is further caused to perform:
   determining a number of the one or more candidate ground control points; and
   determining a geographic distribution of the one or more candidate ground control points for a camera model adjustment,
   wherein the filtering of the one or more candidate ground control points is further based on the number and the geographic distribution.

* * * * *